2 Sheets--Sheet 1.

A. ADAMS.
Improvement in Corn Shellers.

No. 123,758.

Patented Feb. 20, 1872.

Witnesses:
Heinr. F. Bruns
Victor Ruthkirkett

Inventor:
Augustus Adams
by Coburn & Munday
his attys

2 Sheets--Sheet 2.

A. ADAMS.
Improvement in Corn Shellers.

No. 123,758.  Patented Feb. 20, 1872.

Witnesses:  Inventor:
Henr. F. Bours  Augustus Adams
Victor Rathknecht  by Coburn & Munday
  his Attys

123,758

UNITED STATES PATENT OFFICE.

AUGUSTUS ADAMS, OF SANDWICH, ILLINOIS.

IMPROVEMENT IN CORN-SHELLERS.

Specification forming part of Letters Patent No. 123,758, dated February 20, 1872.

SPECIFICATION.

*To whom it may concern:*

Be it known that I, AUGUSTUS ADAMS, of Sandwich, in the county of De Kalb and State of Illinois, have invented certain Improvements in Corn-Shellers; and I hereby declare that the following is a full, clear, and exact description thereof, reference being made to the accompanying drawing, which, together with the letters and figures marked thereon, forms part of this specification, and in which—

Figure 1:
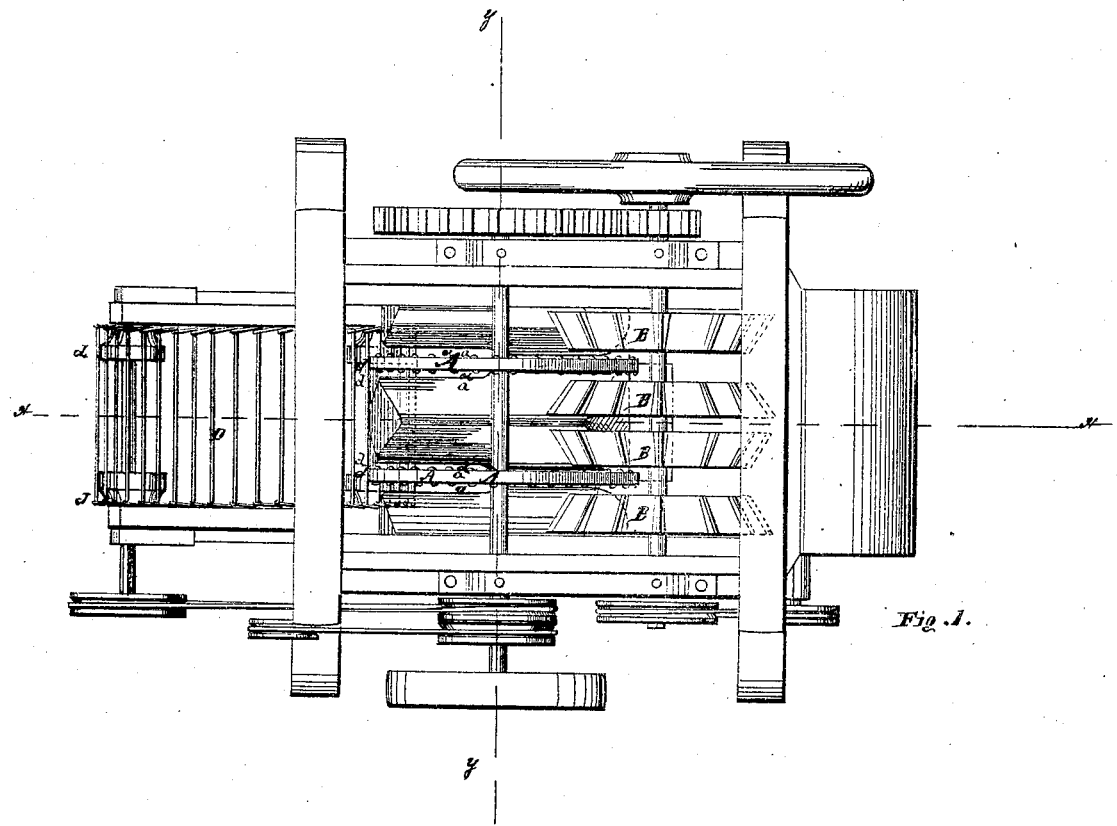
Figure 2:
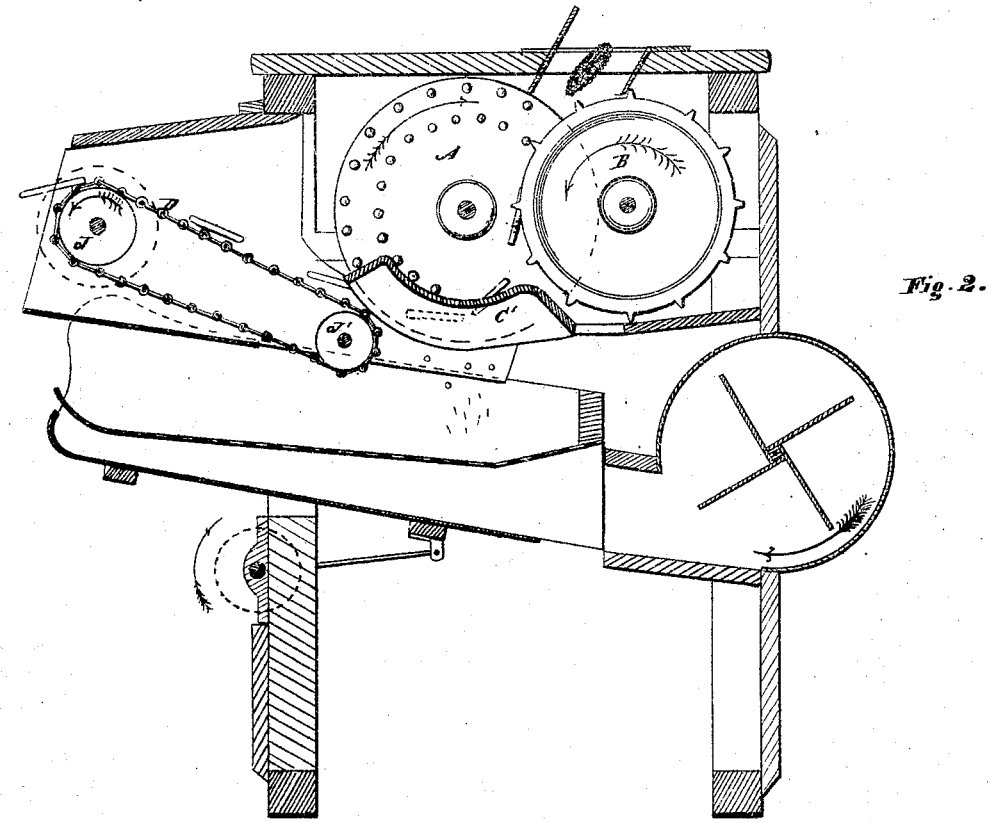
Figure 3:
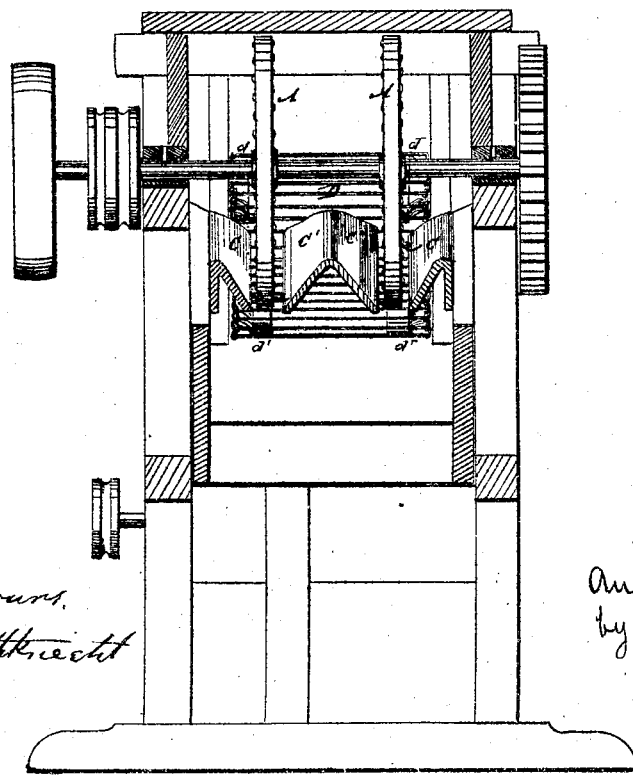

Figure 1 is a top or plan view of a corn-sheller containing my improvement. Fig. 2 is a central longitudinal vertical section of the sheller on the line $x\ x$ of Fig. 1. Fig. 3 is a central transverse vertical section of the sheller on the line $y\ y$ of Fig. 1.

Like letters of reference made use of in the several figures indicate like parts.

Nature of the Invention.

This invention relates to an improvement in power corn-shellers; the object being to produce a more perfect discharge of the cobs, and to prevent their being thrown violently by the shelling-wheels point foremost upon the elevating or conveying rake or reel, causing them to break off and clog the mechanism; and the invention consists in applying to the sheller a shield or series of shields at the lower edge and upon both sides of the picker-wheels, the shields being made to conform to the outline of the wheel, and beveled so as to cast the cobs against it. The cobs are carried along upon the shields by the motion of the wheel, so that they pass lengthwise and flatwise upon the carrier instead of falling point downward thereon. This avoids the danger of the cobs sliding through or sticking in the carrier, and breaking or clogging it. Sufficient space is left between the wheel and shields for the shelled grain to fall through upon the riddles or sieves below.

To enable those skilled in the art to make and use my invention, I will proceed to describe the same with particularity, making use in so doing of the aforesaid drawing by letters of reference thereto.

General Description.

A A are the vertical picker or shelling wheels. B are the beveled corrugated feeding and holding wheels, placed upon both sides of said picker-wheels. These wheels, the pickers and the feeding-wheels, revolve in opposite directions, and act in the usual way to shell the corn. The construction and operation of these parts of the machine, as well as that of the fan-blower and vibrating sieves, are old and well known to the art, and being sufficiently illustrated in the drawing further description is deemed unnecessary. C C' are the curved shields, the outer ones, C, of which are carried upon the sides of the shelling-chamber, presenting their beveled or inclined faces toward the outer faces of the picker-wheels. The central pair, C', are placed between the said picker-wheels, facing each one its adjacent wheel. For the sake of strength, these latter shields may be joined, and they are supported from the frame of the machine by an arm extending to the rear, and also, if desired, by an arm extending up to the front portion of the machine-frame above the cob-carrier. This latter support is not shown in the drawing. These shields C C' are curved, to conform in longitudinal section to the curve of the picker-wheels, and are placed at the lower edge thereof, as shown in the drawing, extending about one-fourth, more or less, of the circumference of said wheels. An interval or space, $a$, is left between the lower edges of the shields and the edges of the wheels sufficient to allow the shelled grain to fall freely through.

By this construction and arrangement, the picker-wheels are caused to run in curved grooves or gutters, with beveled sides and open bottom, formed by the shields C C'.

D is the cob-carrier, consisting of an endless apron of open slat-work passing over the pulleys $d\ d'$, and inclined at an angle to the horizon. This carrier does not extend back any further than is just necessary to reach under and slightly lap the shields C C'.

Corn in the ear to be shelled is passed in at the apertures at the top of the sheller in the usual manner, and is operated upon by the shelling-wheels. The motion of the wheels at the point of shelling being downward, the shelled corn and cobs are thrown down with some force, striking into the gutters formed by the shields C C'. The corn passes through the apertures $a$ and falls upon the vibrating sieve, while the cobs are carried along by contact with the wheel, and, guided by the shield, are thrown upon the reel or carrier in front.

Claims.

Having thus fully described the construction and operation of the invention, what I claim as new, and desire to secure by Letters Patent, is—

1. The beveled curved shields C C′, in combination with the picker-wheels A of a cornsheller, substantially as specified.

2. The combination and arrangement of the picker-wheels A, shields C C′, and endless apron D, substantially as specified.

Witnesses:     AUGUSTUS ADAMS.
  W. M. JONES,
  S. B. STINSON.